US011838609B2

(12) United States Patent
Moriya

(10) Patent No.: US 11,838,609 B2
(45) Date of Patent: Dec. 5, 2023

(54) IMAGE PICKUP APPARATUS

(71) Applicant: CANON KABUSHIKI KAISHA, Tokyo (JP)

(72) Inventor: Ryoko Moriya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/727,576

(22) Filed: Apr. 22, 2022

(65) Prior Publication Data

US 2022/0345594 A1     Oct. 27, 2022

(30) Foreign Application Priority Data

Apr. 27, 2021   (JP) .................................. 2021-075391

(51) Int. Cl.
*H04N 23/51* (2023.01)
*H04N 23/54* (2023.01)
*H04N 23/56* (2023.01)

(52) U.S. Cl.
CPC ............. *H04N 23/51* (2023.01); *H04N 23/54* (2023.01); *H04N 23/56* (2023.01)

(58) Field of Classification Search
CPC ......... H04N 23/54; H04N 23/55; H04N 23/56
See application file for complete search history.

(56) References Cited

U.S. PATENT DOCUMENTS

| 2017/0080251 | A1* | 3/2017 | Yehezkel | ................ H04M 1/17 |
| 2019/0346126 | A1* | 11/2019 | Wada | ........................ H05K 7/20 |
| 2021/0272432 | A1* | 9/2021 | Omata | ............. G08B 13/19619 |
| 2021/0281728 | A1* | 9/2021 | Hong | .................... H04N 23/695 |
| 2021/0406572 | A1* | 12/2021 | Li | ........................... G06V 40/10 |

FOREIGN PATENT DOCUMENTS

| CN | 209445099 U | 9/2019 |
| JP | 2019029956 A | 2/2019 |

* cited by examiner

*Primary Examiner* — Amy R Hsu
(74) *Attorney, Agent, or Firm* — Canon U.S.A., Inc. IP Division

(57) ABSTRACT

An image pickup apparatus includes a housing that includes a top cover and a bottom cover and houses a camera unit, an inner cover disposed inside the housing, and an illumination unit that is disposed inside the housing and includes an illumination device. The inner cover has an opening on an optical path of the illumination device. The inner cover includes a first rib on a side of the top cover and a second rib on a side of the bottom cover. The first rib and the second rib are formed around the opening.

18 Claims, 3 Drawing Sheets

IMAGE PICKUP APPARATUS

BACKGROUND

Field of the Disclosure

The present disclosure relates to an image pickup apparatus that includes an illumination device.

Description of the Related Art

Some cameras are equipped with infrared LEDs for imaging in dark places such as at night. The infrared LED irradiates infrared light through an infrared transmission window provided on a top exterior cover. An LED unit that includes the infrared LED and is disposed close to the infrared transmission window can provide a wide infrared irradiation range. In addition, disposing the LED unit close to the infrared transmission window contributes to the miniaturization of a camera housing.

Generally, in a case where the camera is demanded to have impact resistance, the top and bottom exterior covers may be made of metal rather than resin. This is because a deformation amount of the top cover made of resin when impact is applied is larger. If the LED unit is close to the top cover, the deformed top cover may collide with the LED unit and the LED unit may get damaged. On the other hand, the top cover made of resin can make inexpensive the camera. Therefore, there is a demand for a structure having excellent impact resistance that can protect the LED unit even when the top cover is made of resin.

Chinese Utility-Model Registration No. ("CH") 209445099 discloses an LED headlamp that protects an LED unit from an impact using a shield cover and a spring. Japanese Patent Laid-Open No. ("JP") 2019-29956 discloses a camera that does not require a buffer structure by making a distance between a lens and a dome cover longer than a deformation amount of the dome cover that has received a permissible force.

In the LED headlamp disclosed in CH 209445099, a shield cover protects the surrounding of the lamp. In order to protect the lamp from a large impact, the shield cover needs to be large enough to prevent the deformed shield cover from colliding with the lamp, or the shield cover needs to be thick. As a result, the entire LED headlamp becomes large. Further, the impact-absorbing structure using the spring causes the spring to be fallen off from a joint when a large impact is applied.

The camera disclosed in JP 2019-29956 secures a sufficient distance between the dome and lens so that the dome does not collide with the lens upon impact, and thus the housing becomes large.

SUMMARY OF THE DISCLOSURE

One aspect of the disclosure provides an image pickup apparatus that can realize a wide infrared irradiation range with a small housing and a simple structure.

An image pickup apparatus according to one aspect of the disclosure includes a housing that includes a top cover and a bottom cover and houses a camera unit, an inner cover disposed inside the housing, and an illumination unit that is disposed inside the housing and includes an illumination device. The inner cover has an opening on an optical path of the illumination device. The inner cover includes a first rib on a side of the top cover and a second rib on a side of the bottom cover. The first rib and the second rib are formed around the opening.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

A camera 100 will be described as an example of the image pickup apparatus.

Figure 1:
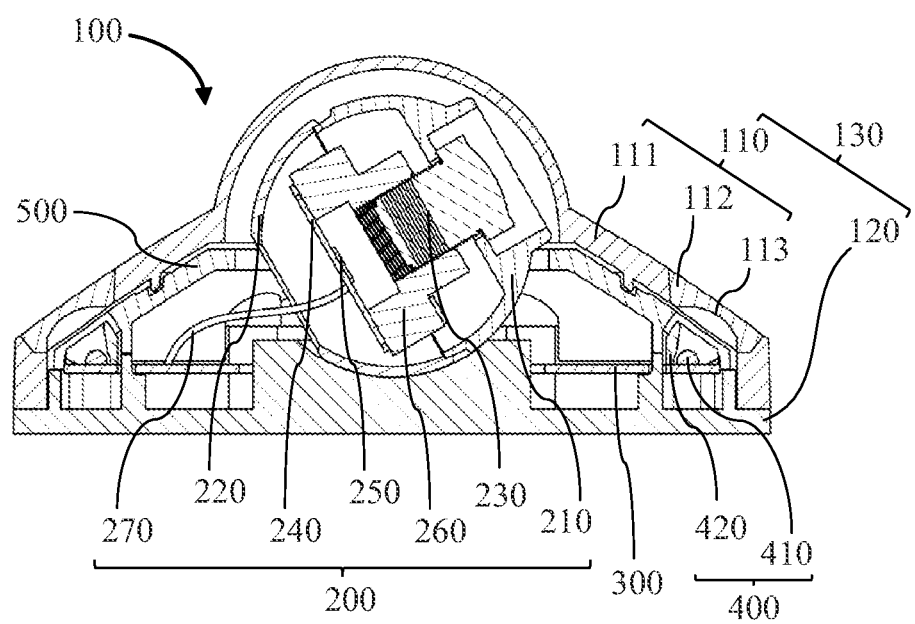
FIG. 1 is an overall sectional view of a camera according to one or more embodiment of the subject disclosure.

FIG. 1 is an overall sectional view of the camera (image pickup apparatus) 100 according to this embodiment. The camera 100 can capture and record images. The camera 100 has a housing 130 that includes a top cover 110 with a dome and a bottom cover 120. The top cover 110 and the bottom cover 120 are fastened to each other with screws, snap fits, or the like. The housing 130 can house a camera unit 200, which will be described later.

The top cover 110 is formed by two-color molding using two types of resins, an infrared non-transmission resin 111 (resin that does not transmit infrared light) and an infrared transmission resin 112 (resin that transmits infrared light). The periphery of the dome of the top cover 110 is formed of the infrared non-transmission resin 111 so as to prevent infrared light from passing through the material of the top cover 110 and entering the dome. On the other hand, at least the infrared transmission resin 112 is formed on an optical path of an LED (illumination device) 410 described later. The top cover 110 is provided with an infrared transmission window portion 113 made of the infrared transmission resin 112. The infrared transmission window portion 113 has at least a lens shape in order to diffuse the light of the LED 410 at a wide angle.

The bottom cover 120 is made of a high-strength material such as glass fiber reinforced plastic or metal diecast. The bottom cover 120 is made of a material having a higher strength than that of the top cover 110.

The camera unit 200 covered with a front cover 210 and a rear cover 220 is disposed in the center inside the housing 130. The camera unit 200 includes a lens 230, an image sensor 250 mounted on a sensor substrate 240, a lens holder 260, and a sensor cable 270 inside the camera unit 200. The camera unit 200 converts light received through a dome portion of the top cover 110 into an electric signal by the image sensor 250.

An LED mounted substrate (illumination substrate) 300 is fixed to the bottom cover 120 by a fixing member such as a screw. The LED mounted substrate 300 and the sensor substrate 240 are connected by a sensor cable 270. Imaging data acquired by the image sensor 250 is transmitted to the LED mounted substrate 300 via the sensor cable 270.

For imaging in a dark place, two LEDs 410 for infrared illumination are mounted on the LED mounted substrate 300 at positions diagonal to the center of the camera unit 200. Reflector 420 surrounds the LED 410. The reflector 420 allows the infrared light to be directed at a desired angle. Diagonally arranging the two LEDs 410 can illuminate an area around 360 degrees. The LED 410 and the reflector 420 will be collectively referred to as an LED unit (illumination unit) 400 hereinafter. The LED unit 400 is disposed inside the housing 130. While this embodiment provides two LEDs 410, but the number of LEDs 410 may be one or more in consideration of necessary use cases such as a case where it is unnecessary to image the area around 360 degrees.

An inner cover 500 is disposed inside the housing 130. The inner cover 500 is fixed to the bottom cover 120 so as to cover the LED mounted substrate 300. The inner cover 500 is made of a high-strength material such as glass fiber reinforced plastic or metal diecast. The inner cover 500 is made of a material having a higher strength than that of the top cover 110.

Figures 2A, 2B:
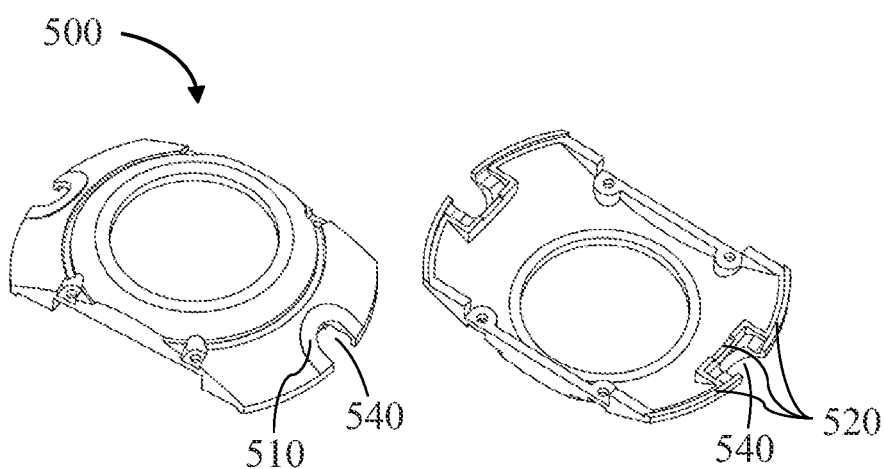
FIGS. 2A and 2B are perspective views of an inner cover according to one or more embodiment of the subject disclosure.

FIGS. 2A and 2B are perspective views of the inner cover 500 according to this embodiment. FIG. 2A is a top perspective view of the inner cover 500. FIG. 2B is a rear perspective view of the inner cover 500. The inner cover 500 has an opening 540 so as not to obstruct the optical path of the LED 410. A first rib 510 is provided close to (on a side of) the top cover 110 and a second rib 520 is provided close to (on a side of) the bottom cover 120. The first rib 510 and the second rib 520 are formed around the opening 540.

Figure 3:
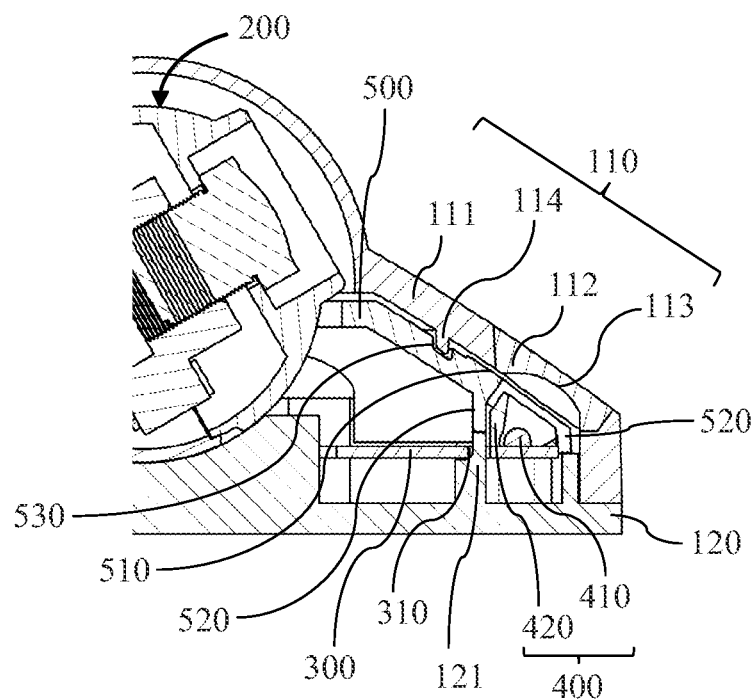
FIG. 3 is a detailed sectional view of the camera according to one or more embodiment of the subject disclosure.

FIG. 3 is a detailed sectional view of the camera 100 according to this embodiment. The bottom cover 120 is formed with a bottom cover rib 121. The LED mounted substrate 300 is formed with a through-hole 310 between the LED unit 400 and the camera unit 200. The bottom cover rib 121 passes through the through-hole 310 and is close to the second rib 520. The second rib 520 formed on the outer periphery of the inner cover 500 is also close to the bottom cover 120. Thereby, the inner cover 500 and the bottom cover 120 exist so that close portions surround the LED unit 400. In this embodiment, the bottom cover rib 121 passes through the through-hole 310, but the second rib 520 may pass through the through-hole 310.

When an impact is applied to the infrared transmission window portion 113 of the top cover 110, the top cover 110 first contacts (collides with) the first rib 510 of the inner cover 500. Next, the second rib 520 of the inner cover 500 contacts (collides with) the bottom cover 120 including the bottom cover rib 121. Since the inner cover 500 and the bottom cover 120 are made of a high-strength material, their deformation amounts are small even when an impact is applied to them. Therefore, when the inner cover 500 and the bottom cover 120 receive an impact at a position surrounding the LED unit 400, the deformation amount of the infrared transmission window portion 113 of the top cover 110 can be reduced. As a result, the top cover 110 can be prevented from contacting (colliding with) the LED unit 400 due to deformation when an impact is applied. Thereby, the LED unit 400 can be brought close to the infrared transmission window portion 113 of the top cover 110, and the housing can be made smaller.

If a lens shape is formed in the infrared transmission window portion 113 in order to diffuse the light of the LED 410 at a wide angle, its part becomes thin and cracks are likely to occur on impact. Therefore, it is possible to prevent the infrared transmission window portion 113 from cracking in the thin portion of the lens shape by reducing the deformation amount of the entire top cover 110. Further, if the LED unit 400 can be brought close to the infrared transmission window portion 113, the necessity for wide-angle diffusion using the lens shape is reduced. Thereby, the lens shape of the infrared transmission window portion 113 can be simplified, so that a wide infrared irradiation range can be obtained with a simple structure.

The top cover 110 includes a top cover rib 114 that is located between the opening 540 of the inner cover 500 and the camera unit 200. A cover groove 530 is formed in the inner cover 500 at a position where the top cover rib 114 is inserted when the top cover 110 and the bottom cover 120 are combined with each other. The top cover rib 114 is close to (contactable) the cover groove 530 at the bottom surface portion and the side surface portion of the top cover rib 114. By providing a position where the top cover 110 and the inner cover 500 are close to each other in a place separate from that of the first rib 510, areas or locations for receiving the top cover 110 when an impact is applied increase, so that the applied force can be dispersed. Moreover, bringing the side surface portion of the top cover rib 114 close to the inner cover 500 can suppress the deformation amount of the top cover 110 even with a horizontal impact. The top cover rib 114 is provided at part of the top cover 110 formed of the infrared non-transmission resin 1/1. Therefore, by inserting the top cover rib 114 into the cover groove 530, the stray light of the LED 410 is blocked by the top cover rib 114. This structure can prevent the light of the LED 410 from entering the dome of the top cover 110, and thus the top cover rib 114 also has a light-shielding effect.

Figure 4:
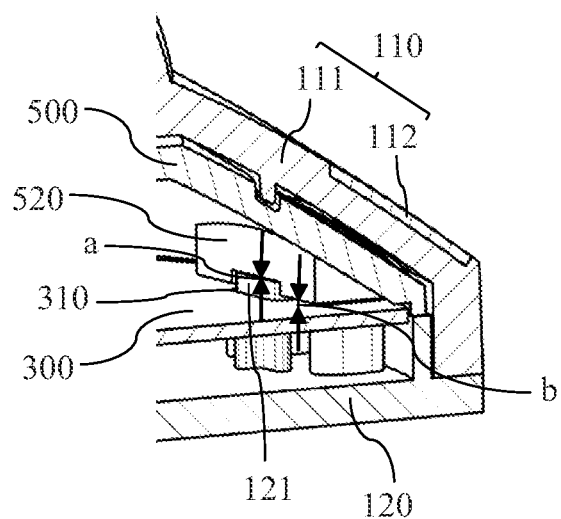
FIG. 4 is a sectional perspective view of and around an LED unit according to one or more embodiment of the subject disclosure.

FIG. 4 is a sectional perspective view of and around the LED unit 400 according to this embodiment. The second rib 520 of the inner cover 500 surrounds the LED unit 400. A distance "a" between the second rib 520 and the bottom cover rib 121 is smaller than a distance "b" between the second rib 520 and the LED mounted substrate 300. Therefore, when an impact is applied, the inner cover 500 contacts (collides with) the bottom cover 120 before the LED mounted substrate 300. Since the inner cover 500 is prevented from contacting (colliding with) the LED mounted substrate 300, the LED mounted substrate 300 can be prevented from deforming or getting damaged.

By surrounding the LED 410 with the second rib 520, the heat radiated from the LED 410 can be cut off from the surrounding components. When a light amount of the LED 410 is increased in order to make the surroundings brighter, a heat amount generated by the LED 410 increases. A large heat amount of the LED 410 becomes large may increase the temperature of the surrounding electric components, and cause them to break down. In addition, components made of resin or rubber may be deformed by the heat of the LED 410. Therefore, blocking the heat of the LED 410 with the second rib 520 can reduce the adverse effect on the surrounding components.

Figure 5:
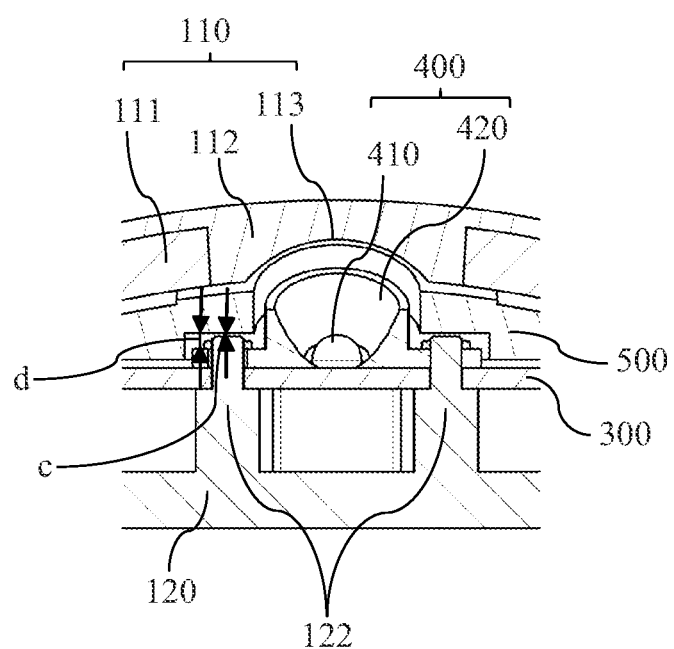
FIG. 5 is a detailed sectional view of and around the LED unit according to one or more embodiment of the subject disclosure.

FIG. 5 is a detailed sectional view of and around the LED unit 400 according to this embodiment. In order for the reflector 420 to efficiently diffuse the light of the LED 410 to a desired angle, the positional accuracy of each of the reflector 420 and the LED 410 is important. Therefore, the bottom cover 120 is formed with a positioning boss 122 for positioning the reflector 420. By inserting the positioning boss 122 into each of the reflector 420 and the LED mounted substrate 300, the positional relationship between the LED 410 and the reflector 420 can be accurately determined. The positioning boss 122 is close to the inner cover 500. At this time, a distance "c" between the positioning boss 122 and the inner cover 500 is smaller than a distance "d" between the reflector 420 and the inner cover 500. Thereby, when an impact is applied to the inner cover 500, the inner cover 500 contacts (collides with) the positioning boss 122 before the reflector 420. Therefore, it is possible to prevent an impact from applying to the reflector 420 due to the contact (collision) of the inner cover 500. Since the reflector 420 is disposed on the LED mounted substrate 300, both the reflector 420 and the LED mounted substrate 300 can be prevented from deforming or getting damaged. Further, by bringing the positioning boss 122 and the inner cover 500 close to each other, the area where the inner cover 500 contacts (collides with) the bottom cover 120 upon impact increases in addition to the outer peripheral portions of the bottom cover rib 121 and the bottom cover 120. Since the area of the bottom cover 120 that receives the impact from the inner cover 500 increases, the deformation amount of the top cover 110 can be further reduced.

The top cover 110 is formed by two-color molding so that the infrared transmission resin 112 covers the infrared non-transmission resin 111 from the exterior side outside the area of the infrared transmission window portion 113. If the infrared transmission window portion 113 is fixed to the top cover 110 by screw or adhesive, stress may be concentrated on the fixed portion and cause cracks or deformations upon impact. The fixed portion may come off. However, when the infrared transmission window portion 113 is formed on the top cover 110 by two-color molding, the infrared transmission window portion 113 is bonded to the surrounding infrared non-transmission resin 111 at the molecular level. Thereby, when an impact is applied, the infrared transmission window portion 113 and the surrounding infrared non-transmission resin 111 are integrally deformed, so that the infrared transmission window portion 113 is unlikely to fall off. Moreover, the top cover 110 can prevent the infrared transmission window portion 113 from easily falling off at the boundary between the two types of resins upon impact, because the infrared transmission resin 112 covers the infrared non-transmission resin 111 from the exterior side outside the infrared transmission window portion 113. If the LED unit 400 can be brought close to the top cover 110, the area of the infrared transmission window portion 113 can be reduced. When the area of the infrared transmission window portion 113 can be reduced, the thin part of the lens shape can also be reduced and the infrared transmission window portion 113 becomes less likely to fall off due to the improved strength.

The above structure can avoid the contact (collision) of the top cover 110 with the LED unit 400, and secure the desired infrared irradiation range, preventing the LED 410 from getting damaged or the reflector 420 from deforming or cracking. Since the LED unit 400 can be brought closer to the top cover 110, a wider-angle infrared irradiation range can be obtained. Bringing the LED unit 400 closer to the top cover 110 can make small the housing.

The above embodiment can provide an image pickup apparatus that can realize a wide infrared irradiation range with a small housing and a simple structure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-075391, filed on Apr. 27, 2021, which is hereby incorporated by reference herein in its entirety.

What is claimed is:

1. An image pickup apparatus comprising:
   a housing that includes a top cover and a bottom cover and houses a camera unit;
   an inner cover disposed inside the housing;
   an illumination unit disposed inside the housing and includes an illumination device, and
   an illumination substrate fixed to the bottom cover and mounted with the illumination unit,
   wherein the inner cover has an opening on an optical path of the illumination device,
   wherein the inner cover includes a first rib on a side of the top cover and a second rib on a side of the bottom cover, the first rib and the second rib being formed around the opening,
   wherein the bottom cover includes a bottom cover rib, and
   wherein a distance between the second rib and the bottom cover rib is shorter than a distance between the second rib and the illumination substrate.

2. The image pickup apparatus according to claim 1, wherein when an impact is applied to the top cover, the top cover, the first rib, the second rib, and the bottom cover come into contact with each other.

3. The image pickup apparatus according to claim 2, wherein when the impact is applied to the top cover, the top cover first comes into contact with the first rib, and then the second rib comes into contact with the bottom cover.

4. The image pickup apparatus according to claim 1, wherein each of the bottom cover and the inner cover is made of a material having a strength higher than that of the top cover.

5. The image pickup apparatus according to claim 1, wherein the top cover is made of resin, and
   wherein each of the bottom cover and the inner cover is made of glass fiber reinforced plastic or metal.

6. The image pickup apparatus according to claim 1, wherein the illumination substrate has a through-hole, and
   wherein one of the bottom cover rib and the second rib passes through the through-hole.

7. The image pickup apparatus according to claim 6, wherein the inner cover is fixed to the bottom cover so as to cover the illumination substrate.

8. The image pickup apparatus according to claim 1, wherein the second rib is formed on the inner cover so as to surround the illumination device.

9. The image pickup apparatus according to claim 1, wherein the illumination unit further includes a reflector that surrounds the illumination device,
   wherein the bottom cover includes a positioning boss for positioning the reflector, and
   wherein the positioning boss is located on a side of the inner cover.

10. The image pickup apparatus according to claim 9, wherein a distance between the positioning boss and the inner cover is shorter than a distance between the reflector and the inner cover.

11. The image pickup apparatus according to claim 1, wherein the top cover includes a top cover rib located between the opening of the inner cover and the camera unit, and
   wherein the inner cover has a cover groove into which the top cover rib is inserted.

12. The image pickup apparatus according to claim 11, wherein each of a side surface portion and a bottom surface portion of the top cover rib is contactable the cover groove.

13. The image pickup apparatus according to claim 11, wherein the top cover rib is provided on part of the top cover that is made of an infrared non-transmission resin.

14. The image pickup apparatus according to claim 1, wherein the top cover includes an infrared transmission window portion made of an infrared transmission resin at least on the optical path of the illumination device, and
wherein the top cover is two-color molded so that the infrared transmission resin covers an infrared non-transmission resin from an exterior side outside an area of the infrared transmission window portion.

15. The image pickup apparatus according to claim 14, wherein at least part of the infrared transmission window has a lens shape.

16. The image pickup apparatus according to claim 1, wherein an area around a dome of the top cover is made of an infrared non-transmission resin.

17. An image pickup apparatus comprising:
a housing that includes a top cover and a bottom cover and houses a camera unit;
an inner cover disposed inside the housing; and
an illumination unit disposed inside the housing, and includes an illumination device and a reflector that surrounds the illumination device
wherein the inner cover has an opening on an optical path of the illumination device,
wherein the inner cover includes a first rib on a side of the top cover and a second rib on a side of the bottom cover, the first rib and the second rib being formed around the opening,
wherein the bottom cover includes a boss for positioning the reflector, and
wherein the boss protrudes to a side of the inner cover from the bottom cover.

18. An image pickup apparatus comprising:
a housing that includes a top cover and a bottom cover and houses a camera unit;
a dome attached to the top cover;
an inner cover disposed inside the housing; and
an illumination unit disposed inside the housing, and includes an illumination device,
wherein the inner cover has an opening on an optical path of the illumination device,
wherein the inner cover includes a first rib on a side of the top cover and a second rib on a side of the bottom cover, the first rib and the second rib being formed around the opening, and
wherein an area around the dome of the top cover is made of an infrared non-transmission resin.

* * * * *